United States Patent
Tagawa et al.

(10) Patent No.: US 9,638,142 B2
(45) Date of Patent: May 2, 2017

(54) VAPORIZED FUEL PROCESSING APPARATUS

(71) Applicant: AISAN KOGYO KABUSHIKI KAISHA, Obu-shi, Aichi-ken (JP)

(72) Inventors: Naoyuki Tagawa, Nagoya (JP); Minoru Akita, Ama (JP); Yoshikazu Miyabe, Obu (JP)

(73) Assignee: AISAN KOGYO KABUSHIKI KAISHA, Obu-Shi, Aichi-ken (JP)

( * ) Notice: Subject to any disclaimer, the term of this patent is extended or adjusted under 35 U.S.C. 154(b) by 0 days.

(21) Appl. No.: 14/684,798

(22) Filed: Apr. 13, 2015

(65) Prior Publication Data

US 2015/0292447 A1  Oct. 15, 2015

(30) Foreign Application Priority Data

Apr. 14, 2014 (JP) .................. 2014-082614

(51) Int. Cl.
*F02M 25/08* (2006.01)
*B60K 15/03* (2006.01)
*B60K 15/035* (2006.01)

(52) U.S. Cl.
CPC .... *F02M 25/0809* (2013.01); *F02M 25/0836* (2013.01); *B60K 15/03519* (2013.01);
(Continued)

(58) Field of Classification Search
CPC .......... F02M 25/0809; F02M 25/0836; B60K 2015/03514; B60K 2015/0319; B60K 15/03519
(Continued)

(56) References Cited

U.S. PATENT DOCUMENTS 6,988,396 B2   1/2006 Matsubara et al.
7,213,450 B2   5/2007 Matsubara et al.
(Continued)

FOREIGN PATENT DOCUMENTS

DE   102007039830 A1   2/2009
JP   2004-156494 A     6/2004
JP   2007-192142 A     8/2007

OTHER PUBLICATIONS

German Patent Application No. 102015004657.8 Office Action dated May 18, 2016 (7 pages).

*Primary Examiner* — William McCalister
*Assistant Examiner* — Ian Paquette
(74) *Attorney, Agent, or Firm* — Conley Rose, P.C.

(57) ABSTRACT

A vaporized fuel processing apparatus has a fuel tank, a canister configured to adsorb vaporized fuel, a vapor path connecting the canister to the fuel tank, a closing valve provided in the vapor path, a pressure sensor measuring inner pressure of the fuel tank, and an electric control unit connected with the closing valve and the pressure sensor. The electric control unit is configured to close or open the closing valve in order to initialize the closing valve or open the closing valve in order to release the vaporized fuel from the fuel tank. Further, the electric control unit is configured to detect failure of the closing valve depending on change in the inner pressure of the fuel tank within a predetermined time from when the closing valve is opened or is closed for initialization of the closing valve or release of the vaporized fuel from the fuel tank.

4 Claims, 7 Drawing Sheets

(52) U.S. Cl.
CPC ................. *B60K 2015/0319* (2013.01); *B60K 2015/03514* (2013.01)

(58) Field of Classification Search
USPC ........................................................ 123/520
See application file for complete search history.

(56) References Cited

U.S. PATENT DOCUMENTS

| | | | |
|---|---|---|---|
| 7,481,101 B2 | 1/2009 | Matsubara et al. | |
| 2004/0089064 A1* | 5/2004 | Kidokoro | F02M 25/0809 73/114.41 |
| 2011/0220071 A1 | 9/2011 | Horiba et al. | |
| 2014/0116401 A1* | 5/2014 | Horiba | F02M 25/0809 123/520 |

* cited by examiner

VAPORIZED FUEL PROCESSING APPARATUS

CROSS-REFERENCE TO RELATED APPLICATIONS

This application claims priority to Japanese patent application serial number 2014-082614, filed Apr. 14, 2014, the contents of which are incorporated herein by reference in their entirety for all purposes.

STATEMENT REGARDING FEDERALLY SPONSORED RESEARCH OR DEVELOPMENT

Not applicable.

BACKGROUND OF THE INVENTION

This disclosure relates to a vaporized fuel processing apparatus having a failure detection function for a closing valve disposed on a path connecting a fuel tank with a canister.

Japanese Laid-Open Patent Publication No. 2004-156494 discloses a conventional vaporized fuel processing apparatus capable of detecting abnormality where a closing valve is left in a closed state. The apparatus opens the closing valve under a condition that a differential pressure between a tank inner pressure and the atmospheric pressure is beyond a predetermined reference value in a state that an internal combustion engine is stopped. In such procedure, when the amount of change in the inner pressure of the fuel tank is small, the apparatus determines that the closing valve is in a closed fastening state.

However, the apparatus should open the closing valve only for each failure detecting operation. Accordingly, there has been a need for improved vaporized fuel processing apparatuses.

BRIEF SUMMARY OF THE INVENTION

In one aspect of this disclosure, a vaporized fuel processing apparatus has a fuel tank, a canister configured to adsorb vaporized fuel, a vapor path connecting the canister and the fuel tank to each other, a closing valve provided in the vapor path, a pressure sensor configured to measure inner pressure of the fuel tank, and an electric control unit connected with the closing valve and the pressure sensor. The electric control unit is configured to close or open the closing valve in order to initialize the closing valve or open the closing valve in order to release the vaporized fuel from the fuel tank. Further, the electric control unit is configured to detect failure of the closing valve depending on change in the inner pressure of the fuel tank within a predetermined time from when the closing valve is opened or is closed for initialization of the closing valve or release of the vaporized fuel from the fuel tank.

According to the aspect of this disclosure, when the closing valve is opened or is closed for initialization of the closing valve or release of the vaporized fuel from the fuel tank, it is able to detect failure of the closing valve depending on change in the inner pressure of the fuel tank within the following predetermined time. Thus, no additional opening or closing operation of the closing valve only for detection of failure is required.

DETAILED DESCRIPTION OF THE INVENTION

Each of the additional features and teachings disclosed above and below may be utilized separately or in conjunction with other features and teachings to provide improved vaporized fuel processing apparatuses. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
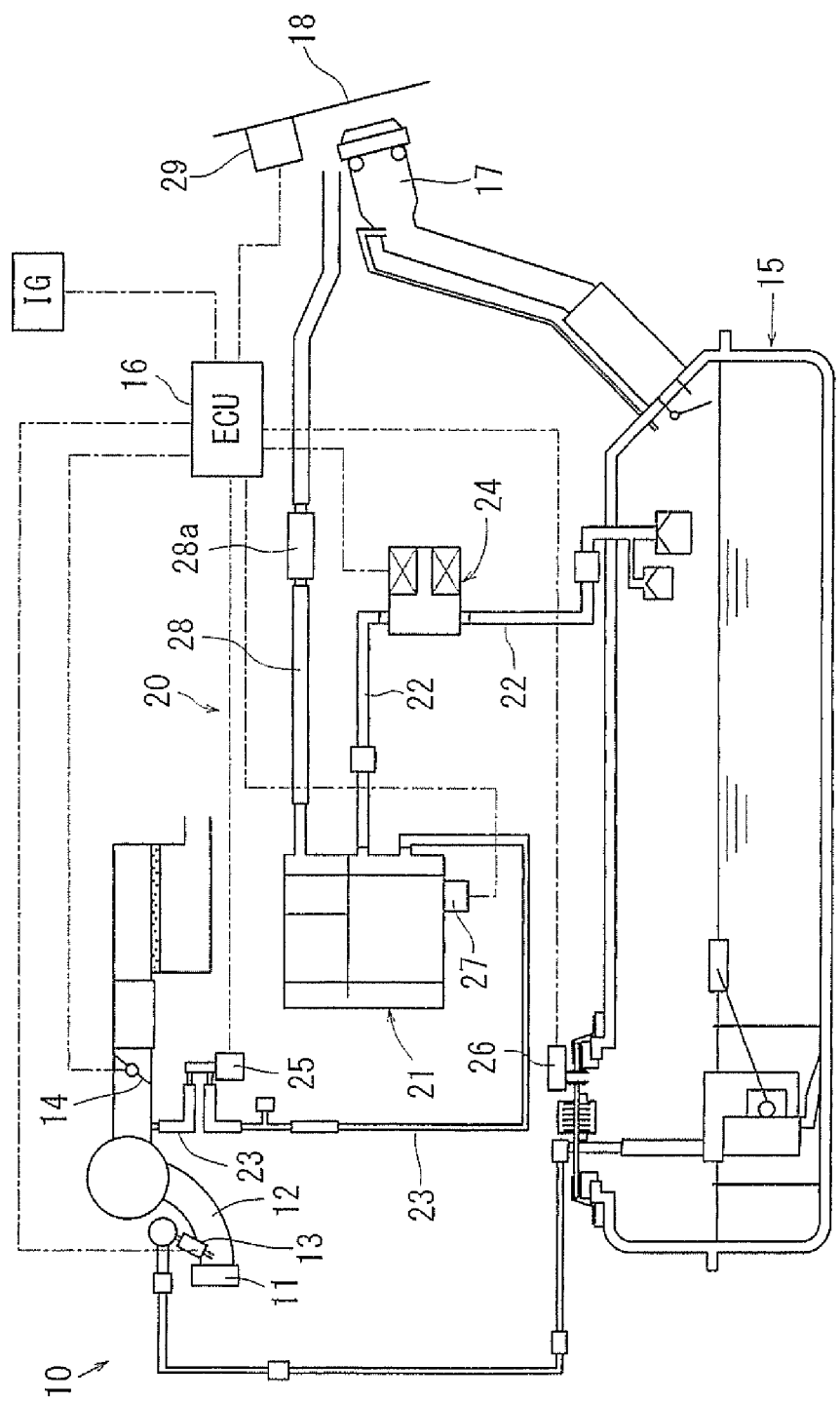
FIG. 1 is a diagram illustrating the construction of a vaporized fuel processing apparatus according to a first embodiment.
Figure 2:
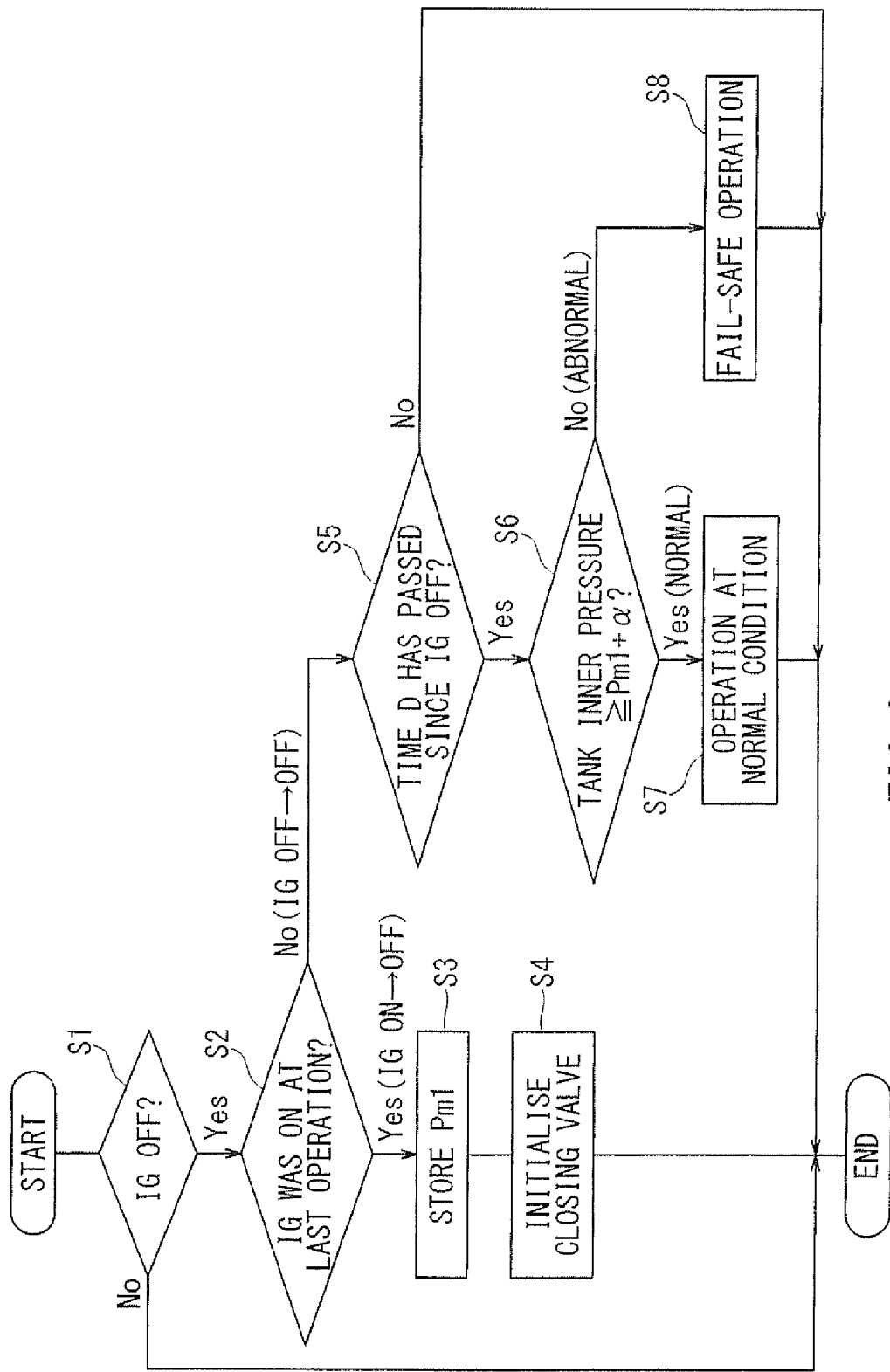
FIG. 2 is a flowchart of an operation for detecting the open fastening of the closing valve according to the first embodiment.
Figure 3:
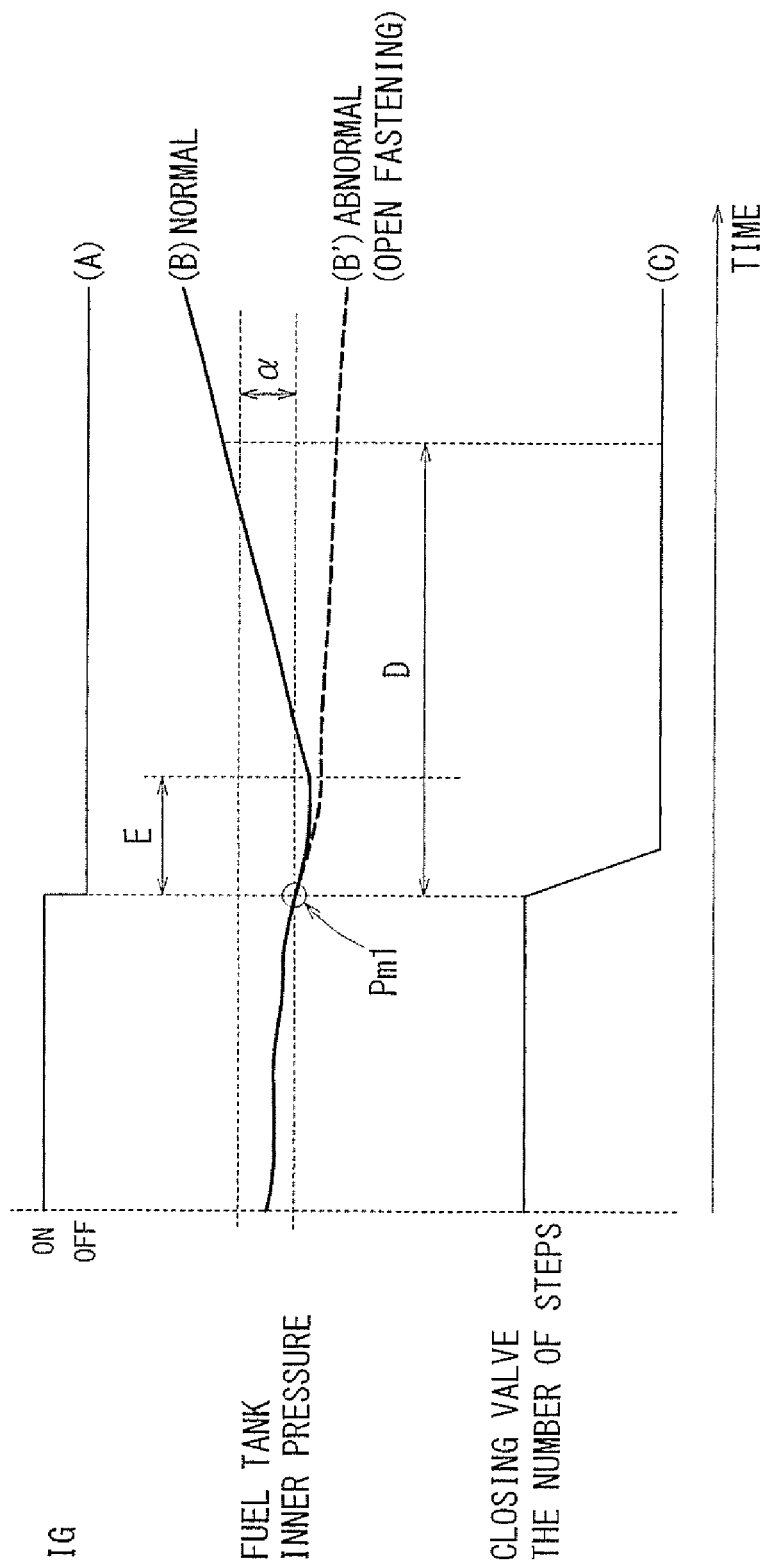
FIG. 3 is a graph illustrating the detection of the open fastening of the closing valve according to the first embodiment.

A first embodiment of this disclosure will be described in reference with FIGS. 1 to 3. As shown in FIG. 1, an engine system 10 for a vehicle is equipped with a vaporized fuel processing apparatus 20.

The engine system 10 has a known basic configuration and provides mixed gas of air and fuel to an internal combustion engine 11 via an air intake path 12. During providing the mixed gas, a fuel injection valve 13 controls the flow rate of the fuel, and a throttle valve 14 controls the flow rate of the air. The fuel injection valve 13 and the throttle valve 14 are connected to an electric control unit (ECU) 16. The throttle valve 14 outputs signals relating to the opening ratio of the throttle valve 14 to the ECU 16. The ECU 16 controls the valve opening time of the fuel injection valve 13. The fuel injection valve 13 is supplied with the fuel having a predetermined pressure, and the fuel is provided from a fuel tank 15.

In the vaporized fuel processing apparatus 20, the vaporized fuel, which has vaporized during refueling or in the fuel tank 15, is sent to a canister 21 via a vapor path 22 and is adsorbed in the canister 21. Then, during a purge operation, the vaporized fuel is supplied from the canister 21 via a purge path 23 to the air intake path 12 downstream of the throttle valve 14. The vapor path 22 is equipped with a closing valve 24 having a stepping motor for opening and closing the vapor path 22. The purge path 23 is equipped with a purge valve 25 for opening and closing the purge path 23. The canister 21 is filled with an adsorbent such as activated carbon. The canister 21 adsorbs the vaporized fuel from the vapor path 22 by the adsorbent, and releases the vaporized fuel into the purge path 23. The canister 21 is connected with an atmospheric path 28. When the intake negative pressure is applied to the canister 21, air flows into the canister 21 via the atmospheric path 28 for purging the vaporized fuel from the canister 21. The atmospheric path 28 is configured to intake the atmospheric air near a fill opening 17 formed on the fuel tank 15. The atmospheric path 28 has an air filter 28a in the middle of the atmospheric path 28. The fill opening 17 is positioned near an outer surface of a vehicle body, and is covered with an openable lid 18. The lid 18 is equipped with a lid switch 29 composed of a limit switch, which detects an opening state and a closed state of the lid 18.

The ECU 16 receives various signals required for controlling the valve opening time of the fuel injection valve 13. In addition to the signals relating to the opening ratio of the throttle valve 14, the ECU 16 receives, for example, signals from a pressure sensor 26 detecting inner pressure of the fuel tank 15, signals from a temperature sensor 27 detecting temperature in the canister 21, and signals from the lid switch 29. In addition to the control of the valve opening time of the fuel injection time 13, for example, the ECU 16 opens and closes the closing valve 24 and the purge valve 25.

The operation for detecting the valve open fastening of the closing valve 24 by the ECU 16 will be described in reference to the flowchart of FIG. 2. Here, the valve open fastening means a situation that the closing valve 24 remains in the open position such that the closing valve 24 cannot be closed. At the step S1, it is determined whether an ignition switch IG as the power switch of the vehicle is off. When the ignition switch is not off, the step S1 is determined as No, and the operation for detecting the valve open fastening is finished. When the ignition switch IG is off, the step S1 is determined as Yes, and then at the step S2, it is determined whether the ignition switch IG was on at the last operation. When the ignition switch IG was on at the last operation, that is, when the ignition switch IG has been changed from on to off, the step S2 is determined as Yes, and at the step S3, the inner pressure Pm1 of the fuel tank 15 at the time is stored. Then, at the step S4, the closing valve 24 is initialized. That is, the stepping motor is operated such that the closing valve 24 takes a predetermined initial position. The initial position in this case is a position where the closing valve 24 is completely closed.

At the step S2, when the ignition switch IG was not on at the last operation, that is, when the ignition switch IG was off at the last operation, the step S2 is determined as No, and then at the step S5, it is determined whether a predetermined time D has passed since the ignition switch was changed from on to off. When the predetermined time D has not passed, the step S5 is determined as No, the operation for detecting the valve open fastening is finished. When the predetermined time D has passed, the step S5 is determined as Yes, and at the step S6, it is determined whether the inner pressure of the fuel tank 15 is equal to or higher than a value that is the stored inner pressure Pm1 plus a predetermined value α. When the inner pressure of the fuel tank 15 is equal to or higher than the value that is the stored inner pressure Pm1 plus the predetermined value α, the step S6 is determined as Yes, and at the step S7, it is determined that the closing valve 24 operates normally. On the other hand, when the inner pressure of the fuel tank 15 is lower than the value that is the stored inner pressure Pm1 plus the predetermined value α, the step S6 is determined as No, and at the step S8, it is determined that the closing valve 24 is in the open fastening state, and then a predetermine fail-safe operation is carried out.

The operation according to the first embodiment will be described in reference to FIG. 3. When the ignition switch IG is turned off as shown by the line (A) in FIG. 3, the closing valve 24 is controlled to be in the initial position as shown by the line (C) in FIG. 3. As shown by the solid line (B) in FIG. 3, after the predetermined time D from turning off of the ignition switch IG, when the increase in the inner pressure of the fuel tank 15 from the pressure Pm1, which is the pressure at turning off of the ignition switch IG, is equal to or more than the predetermined value α, it is determined that the closing valve 24 is not in the open fastening state and is in the normal condition. When the closing valve 24 is operated to be in the initial position in order to be closed, the fuel tank 15 is closed, so that the inner pressure of the fuel tank 15 increases due to generation of the vaporized fuel. Thus, when the inner pressure of the fuel tank 15 increases, it can be determined that the closing valve 24 is not in the open fastening state. On the other hand, as shown by the dashed line (B') in FIG. 3, after the predetermined time D from turning off of the ignition switch IG, when the increase in the inner pressure of the fuel tank 15 from the pressure Pm1, which is the pressure at turning off of the ignition switch IG, is not equal to nor more than the predetermined value α, it is determined that the closing valve is in the open fastening state. As described above, when the closing valve 24 operates normally, the inner pressure of the fuel tank 15 should increase. Thus, when the inner pressure of the fuel tank 15 does not increase, it is determined that the closing valve 24 cannot be closed due to the valve open fastening. Here, in FIG. 3, a time between the initialization of the closing valve 24 to be in the closed position and the beginning of increase in the inner pressure of the fuel tank 15 is shown by E. The predetermined time D is set to be longer than the time E.

According to the first embodiment, it is able to utilize closing of the closing valve 24 for initialization in order to determine whether the closing valve 24 is in the open fastening state or not. Thus, it is not necessary to close the closing valve 24 only for detection of the valve open fastening of the closing valve 24. Therefore, the closing operation of the closing valve 24 only for detection of the failure in the closing valve 24 can be omitted.

Figure 4:
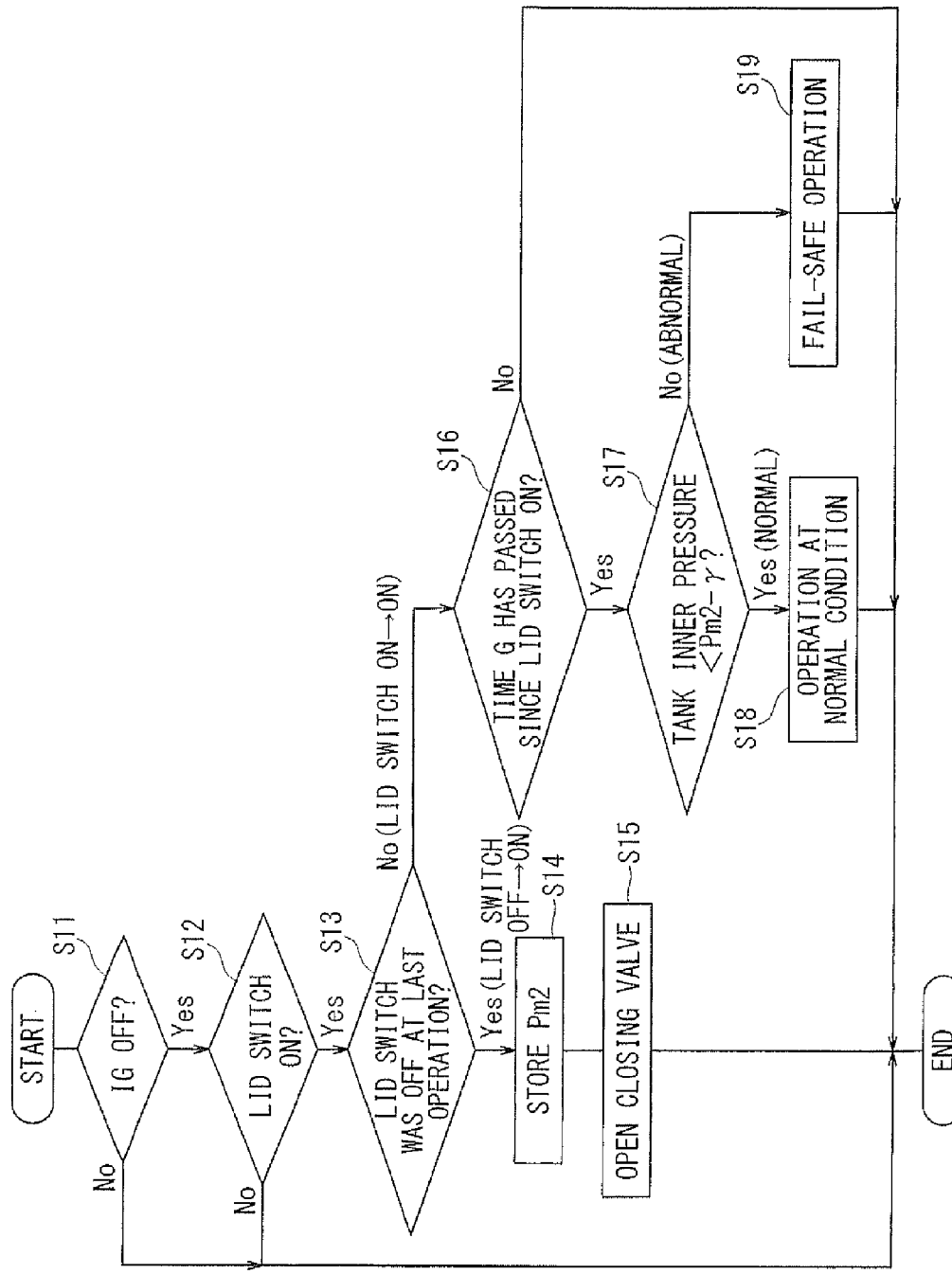
FIG. 4 is a flowchart of an operation for detecting the closed fastening of the closing valve according to a second embodiment.

FIG. 4 shows an operation for detecting the closed fastening of the closing valve 24 according to a second embodiment. Here, the closed fastening of the closing valve 24 means a situation that the closing valve 24 remains in the closed position such that the closing valve 24 cannot be opened. The difference of the second embodiment from the first embodiment is to detect the closed fastening of the closing valve 24 instead of the open fastening of the closing valve 24. Other configurations of the second embodiment are same with those of the first embodiment.

At the step S11 in FIG. 4, it is determined whether the ignition switch IG as the power switch of the vehicle is off. When the ignition switch is not off, the step S11 is determined as No, and the operation for detecting the valve closed fastening is finished. When the ignition switch IG is off, the step S11 is determined as Yes, and then at the step S12, it is determined whether the lid switch 29 is on or not. When the lid 18 is removed for opening the fill opening 17 of the fuel tank 15, the lid switch 29 detects such movement of the lid 18 and is to be turned on. When the lid switch 29 is not on, the step S12 is determined as No, and the operation for detecting the valve closed fastening is finished. When the lid 18 has been removed for opening the fill opening 17 of the fuel tank 15 and the lid switch 29 has been turned on, the step S12 is determined as Yes, and at the step S13, it is determined whether the lid switch 29 was off at the last operation. When the lid switch 29 was off at the last operation, that is, when the lid switch 29 has been changed from off to on, the step S13 is determined as Yes, and at the step S14, the inner pressure Pm2 of the fuel tank 15 at the time is stored. Then, at the step S15, the closing valve 24 is open by the predetermined amount. That is, when the fill opening 17 of the fuel tank 15 is opened, the stepping motor of the closing valve 24 is operated in order to decrease the inner pressure of the fuel tank 15.

At the step S13, when the lid switch 29 was not off at the last operation, that is, when the lid switch 29 was also on at the last operation, the step S13 is determined as No, and at the step S16, it is determined whether the predetermined time G has passed since change of the lid switch 29 from off to on. When the predetermined time G has not passed, the step S16 is determined as No, the operation for detecting the closed fastening is finished. When the predetermined time G has passed, the step S16 is determined as Yes, and at the step S17, it is determined whether the inner pressure of the fuel tank 15 is lower than a value that is the stored inner pressure Pm2 minus the predetermined value γ. When the inner pressure of the fuel tank 15 is lower than the value that is the stored inner pressure Pm2 minus the predetermined value γ, the step S17 is determined as Yes, and at the step S18, it is determined that the closing valve 24 operates normally. On the other hand, when the inner pressure of the fuel tank 15 is not lower than the value that is the stored inner pressure Pm2 minus the predetermined value γ, the step S17 is determined as No. Then, at the step S19, it is determined that the closing valve 24 is in the closed fastening state, and a predetermined fail-safe operation is carried out.

Figure 5:
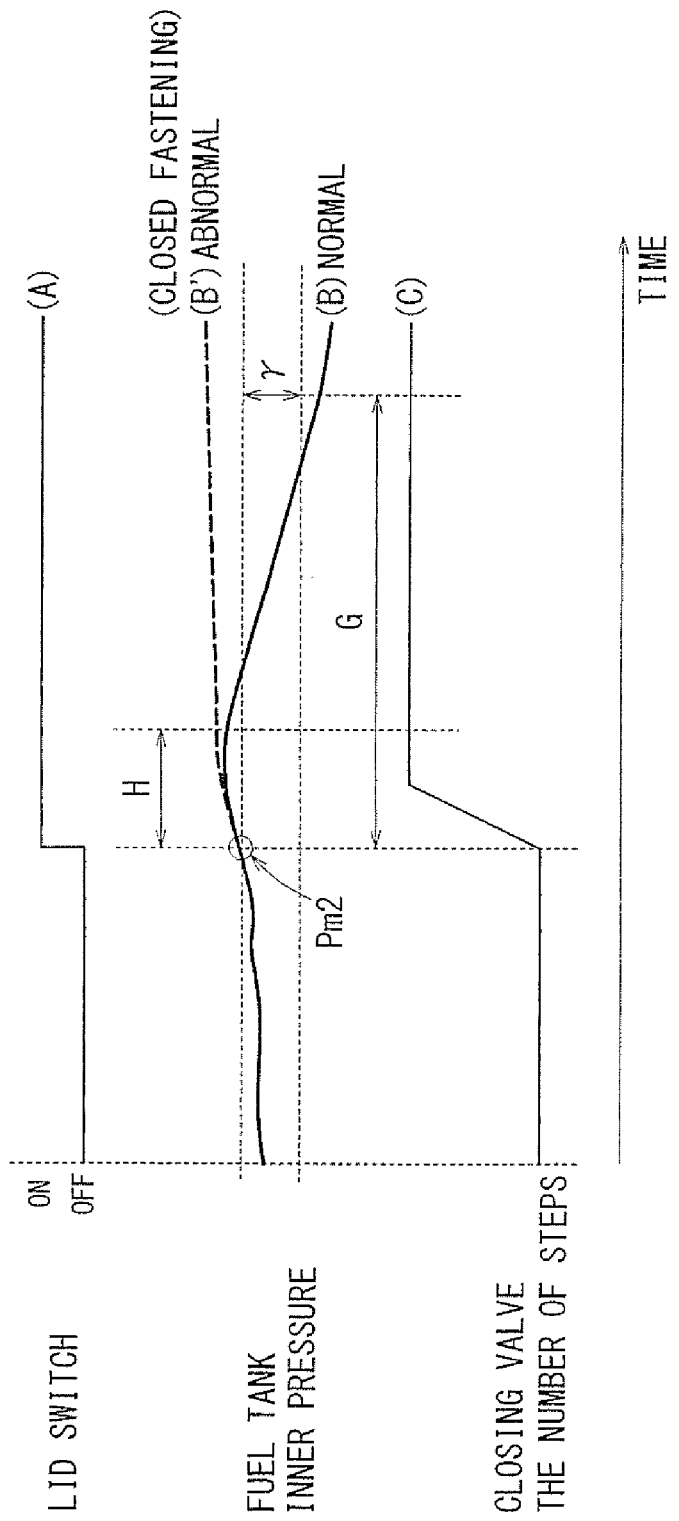
FIG. 5 is a graph illustrating the detection of the closed fastening of the closing valve according to the second embodiment.

The operation according to the embodiment of FIG. 4 will be described in reference to FIG. 5. When the lid 18 is removed for opening the fill opening 17 of the fuel tank 15 and then the lid switch 29 is turned on as shown by the line (A) in FIG. 5, the closing valve 24 is operated to be open by the predetermined amount as shown by the line (C) in FIG. 5. As shown by the solid line (B), after the predetermined time G from changing of the lid switch 29 from off to on, when the inner pressure of the fuel tank 15 is lower than a value that is the pressure Pm2, which is the pressure at changing of the lid switch 29 from off to on, minus the predetermined value γ, it is determined that the closing valve 24 is not in the closed fastening state and is in the normal condition. When the closing valve 24 is opened by the predetermined amount, the fuel tank 15 is also open, so that the inner pressure of the fuel tank 15 decreases due to release of the vaporized fuel. Thus, when the inner pressure of the fuel tank 15 decreases, it can be determined that the closing valve 24 is not in the closed fastening state. On the other hand, as shown by the dashed line (B') in FIG. 3, after the predetermined time G, when the inner pressure of the fuel tank 15 is not lower than the value that is the pressure Pm2, which is the pressure at changing of the lid switch 29 from off to on, minus the predetermined value γ, it is determined that the closing valve 24 is in the closed fastening state. As described above, when the closing valve 24 is in the normal condition, the inner pressure of the fuel tank 15 should decrease. Thus, when the inner pressure of the fuel tank 15 does not decrease, it can be determined that the closing valve 24 is in the closed fastening state and cannot be opened. Here, in FIG. 5, a time between the opening of the closing valve 24 and the beginning of decrease in the inner pressure of the fuel tank 15 is shown by H. The predetermined time G is set to be longer than the time H.

According to the second embodiment, when the fill opening 17 is opened for supplying fuel to the fuel tank 15, the opening of the closing valve 24 associated with the removing of the lid 18 can be utilized for detecting the closed fastening of the closing valve 24. Thus, it is not necessary to open the closing valve 24 only for detecting the closed fastening of the closing valve 24. Therefore, the movement of the closing valve 24 only for detection of the failure in the closing valve 24 can be omitted.

Figure 6:
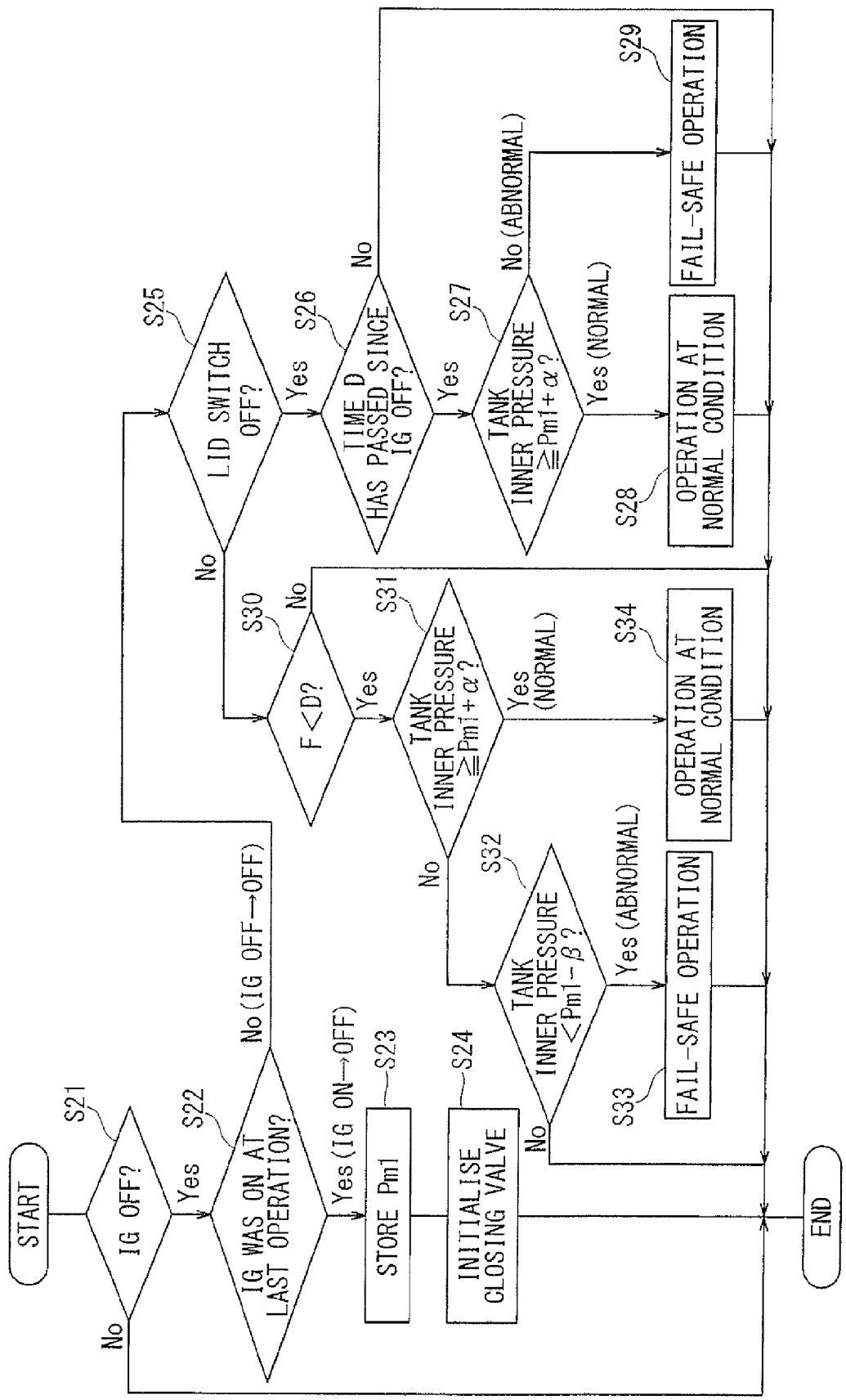
FIG. 6 is a flowchart of an operation for detecting the open fastening of the closing valve according to a third embodiment.

FIG. 6 shows an operation for detecting the open fastening of the closing valve 24 according to the third embodiment. The difference of the third embodiment from the first embodiment is to determine whether the closing valve 24 is in the open fastening state when the fuel is supplied to the fuel tank 15 during detecting the open fastening of the closing valve 24 after changing of the ignition switch IG from on to off. Other configurations of the third embodiment are same with those of the first embodiment.

At the step S21 in FIG. 6, it is determined whether the ignition switch IG is off or not. When the ignition switch IG is not off, the step S21 is determined as No, and the operation for detecting the valve open fastening is finished. When the ignition switch IG is off, the step S21 is determined as Yes, and at the step S22, it is determined whether the ignition switch IG was on at the last operation. When the ignition switch IG was on, that is, when the ignition switch IG has been changed from on to off, the step S22 is determined as Yes, and at the step S23, the inner pressure Pm1 of the fuel tank 15 at the time is stored. Then, at the step S24, the closing valve 24 is initialized. That is, the stepping motor is operated such that the closing valve 24 takes the predetermined initial position.

At the step S22, when the ignition switch IG was not on at the last operation, that is, when the ignition switch IG was also off at the last operation, the step S22 is determined as No, and at the step S25, it is determined whether the lid switch 29 is off. That is, it is determined whether the lid 18 is closed. When the lid switch 29 is off, the step S25 is determined as Yes, and at the step S26, it is determined whether the predetermined time D has passed since changing of the ignition switch IG from on to off. When the predetermined time D has not passed, the step S26 is determined as No, the operation for detecting the valve open fastening is finished. When the predetermined time D has passed, the step S26 is determined as Yes, and at the step S27, it is determined whether the inner pressure of the fuel tank 15 is equal to or higher than a value that is the stored inner pressure Pm1 plus the predetermined value α. When the inner pressure of the fuel tank 15 is equal to or higher than the value that is the stored inner pressure Pm1 plus the predetermined value α, the step S27 is determined as Yes, and at the step S28, it is determined that the closing valve 24 operates normally. On the other hand, when the inner pressure of the fuel tank 15 is not equal to nor higher than the value that is the stored inner pressure Pm1 plus the predetermined value α, the step S27 is determined as No. Then, at the step S29, it is determined that the closing valve 24 is in the open fastening state, and a predetermined fail-safe operation is carried out. Above described steps except the step S25 are same those in the first embodiment.

At the step S25 where it is determined whether the lid switch 29 is off, when the lid 18 is open for supplying the fuel to the fuel tank 15 such that the lid switch 29 is on, the step S25 is determined as No, and at the step S30, it is determined whether a time F after changing of the ignition switch IG from on to off is shorter than the predetermined time D. When the time F is longer than the predetermined time D, the step S30 is determined as No, and the operation for detecting the valve open fastening is finished. That is, in this case, the determination of the valve open fastening is carried out when the predetermined time D has passed since the changing of the ignition switch IG from on to off, and then the lid switch 29 is turned on. Therefore, no additional operation is required.

When the time F is shorter than the predetermined time D, the step S30 is determined as Yes, and at the step S31, it is determined whether the inner pressure of the fuel tank 15 is equal to or higher than the value that is the stored inner pressure Pm1 plus the predetermined value $\alpha$. When the inner pressure of the fuel tank 15 is equal to or higher than the value that is the stored inner pressure Pm1 plus the predetermined value $\alpha$, the step S31 is determined as Yes, and at the step S34, it is determined that the closing valve 24 operates normally. On the other hand, when the inner pressure of the fuel tank 15 is lower than the value that is the stored inner pressure Pm1 plus the predetermined value $\alpha$, the step S31 is determined as No, and at the step S32, it is determined whether the inner pressure of the fuel tank 15 is lower than a value that is the stored inner pressure Pm1 minus the predetermined value $\beta$. When the inner pressure of the fuel tank 15 is lower than the value that is the stored inner pressure Pm1 minus the predetermined value $\beta$, the step S32 is determined as Yes. Then, at the step S33, it is determined that the closing valve 24 is in the open fastening state, and a predetermined fail-safe operation is carried out. When the step S32 is determined as No, the inner pressure of the fuel tank 15 is lower than the value that is the stored inner pressure Pm1 plus the predetermined value $\alpha$ and is higher than the value that is the stored inner pressure Pm1 minus the predetermined value $\beta$. Thus, it cannot be determined whether the closing valve 24 is in the open fastening state, so that the operation for detecting the valve open fastening is finished. Therefore, the determination of the valve open fastening of the closing valve 24 is to be carried out in a next operation.

The operation according to the third embodiment will be described in reference to FIG. 7. When the ignition switch IG is changed from on to off as shown by the line (A) in FIG. 7, the closing valve 24 is operated to be in the initial position as shown by the line (D) in FIG. 7. After the time E from the changing of the ignition switch IG from on to off, when the closing valve 24 is not in the open fastening state, the inner pressure of the fuel tank 15 gradually increases from the inner pressure Pm1 as shown by the line (C). However, in this case, because the lid 18 is opened and the lid switch 29 is changed from off to on after the time F and within the time D from the changing of the ignition switch IG from on to off, it cannot be determined whether the closing valve 24 is in the open fastening state or not after the time D from the changing of the ignition switch IG from on to off. Even so, because it is clear that the inner pressure of the fuel tank 15 is higher than the value that is the inner pressure Pm1 plus the predetermined value $\alpha$ after the time F and it is clear that the inner pressure of the fuel tank 15 is higher than the value that is the inner pressure Pm1 plus the predetermined value $\alpha$ after the time D, it can be determined that the closing valve 24 is not in the open fastening state. On the other hand, when the inner pressure of the fuel tank 15 is lower than the value that is the inner pressure Pm1 minus the predetermined value $\beta$ after the time F from the changing of the ignition switch IG from on to off as shown by the dashed line (C') in FIG. 7, it is also clear that the inner pressure of the fuel tank 15 is lower than the value that is the inner pressure Pm1 minus the predetermined value $\beta$ after the time D from the changing of the ignition switch IG from on to off. Thus, it can be determined that the closing valve 24 is in the open fastening state.

Figure 7:
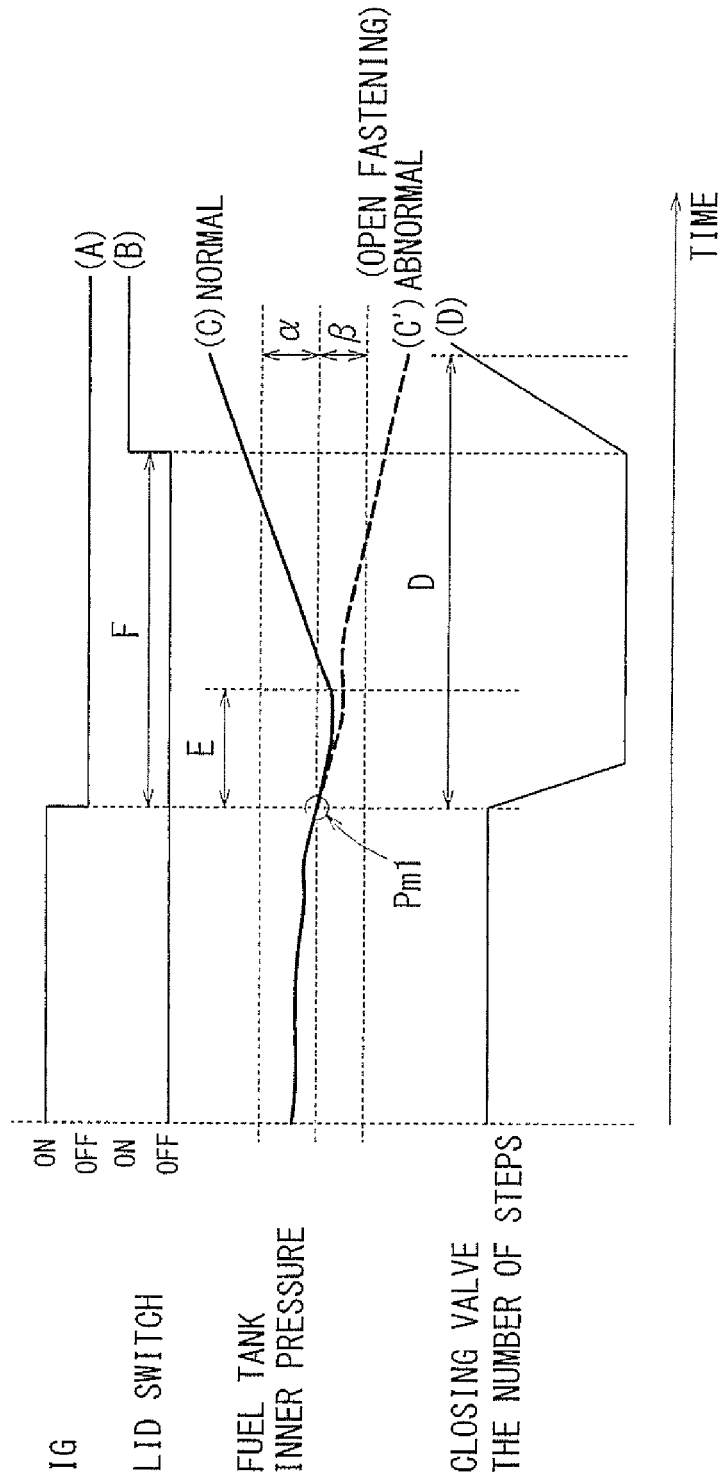
FIG. 7 is a graph illustrating the detection of the open fastening of the closing valve according to the third embodiment.

According to the embodiment of FIGS. 6 and 7, even when the fill opening 17 is opened after the power switch is turned off, the closing of the closing valve 24 due to initialization of the closing valve 24 can be utilized in order to determine whether the closing valve 24 is in the open fastening state.

In the first to third embodiments, operations at the step S4, the step S15 and the step S24 correspond to a closing valve operation means. Operations at the steps S5 and S6, the steps S16 and S17, and the steps S26 and S27 correspond to an abnormality detection means. Operations at the step S4 and the step S24 correspond to an initialization means. Operation at the step S15 corresponds to a depressurization means. Operations at the steps S12 and S13, and the step S25 correspond to a means for detecting the opening of the fill opening. Operation at the step S31 corresponds to a means for determining that the closing valve is not in the open fastening state. Operation at the step S32 corresponds to a means for determining that the closing valve is in the open fastening state.

The vaporized fuel processing apparatus of this disclosure can be modified without departing from the scope of the invention. For example, the closing valve 24 can be equipped with various movement mechanisms instead of the stepping motor. The initial position of the closing valve 24 is set to be closed position in the embodiments, however, the initial position of the closing valve 24 can be set to be open position. In such case, when the ignition switch IG is changed from on to off and the closing valve 24 is initialized, it can be determined whether the closing valve 24 is in the closed fastening state or not. Further, the vaporized fuel processing apparatus of this disclosure is used in the engine system of the vehicle in the embodiments, however, the vaporized fuel processing apparatus of this disclosure is not limited to be used for the vehicle. The vaporized fuel processing apparatus can be used in an engine system of a hybrid vehicle having an internal combustion engine and an electric motor.

The invention claimed is:

1. A vaporized fuel processing apparatus comprising:
a fuel tank;
a canister configured to adsorb vaporized fuel;
a vapor path connecting the canister and the fuel tank to each other;
a closing valve provided in the vapor path;
a pressure sensor configured to measure inner pressure of the fuel tank;
a power switch; and
an electric control unit connected with the closing valve, the pressure sensor, and the power switch;
wherein the electric control unit is configured to actuate the closing valve to a predetermined initial closed position when the power switch is turned off; and
wherein the electric control unit is configured to determine whether the closing valve is in an open fastening state while the closing valve is in the predetermined initial closed position based on whether a change in the inner pressure of the fuel tank is equal to or more than a first predetermined value, after a predetermined time from when the closing valve is actuated to the predetermined initial closed position.

2. The vaporized fuel processing apparatus according to claim 1, wherein the fuel tank has a fill opening;
wherein the electric control unit is configured to detect a preliminary step of the fill opening toward opening for fuel supply to the fuel tank; and
wherein the electric control unit is configured to determine that the closing valve is not in the open fastening state when the fill opening is in the preliminary step toward opening within the predetermined time and when an increase in the inner pressure of the fuel tank is equal to or more than a second predetermined value.

3. The vaporized fuel processing apparatus according to claim 1, wherein the fuel tank has a fill opening;
wherein the electric control unit is configured to detect a preliminary step of the fill opening toward opening for fuel supply to the fuel tank;
wherein the electric control unit is configured to determine that the closing valve is in the open fastening state when the fill opening is in the preliminary step toward opening within the predetermined time and when a decrease in the inner pressure of the fuel tank is equal to or more than a third predetermined value.

4. A vaporized fuel processing apparatus, comprising:
a fuel tank having a fill opening;
a canister configured to adsorb vaporized fuel;
a vapor path connecting the canister and the fuel tank to each other;
a closing valve provided in the vapor path;
a pressure sensor configured to measure an inner pressure of the fuel tank; and
an electric control unit connected with the closing valve and the pressure sensor;
wherein the electric control unit is configured to open the closing valve for release of the vaporized fuel from the fuel tank when the fill opening is opened for fuel supply to the fuel tank; and
wherein the electric control unit is configured to determine whether the closing valve is in a closed fastening state based on whether a change in the inner pressure of the fuel tank is equal to or more than a predetermined value after a predetermined time from when the closing valve is opened for release of the vaporized fuel from the fuel tank in a state where the fill opening is opened.

* * * * *